Feb. 6, 1973    C. L. TILLEY    3,714,721
EDUCATIONAL AND AMUSEMENT DEVICES
Filed Dec. 9, 1971    3 Sheets-Sheet 1
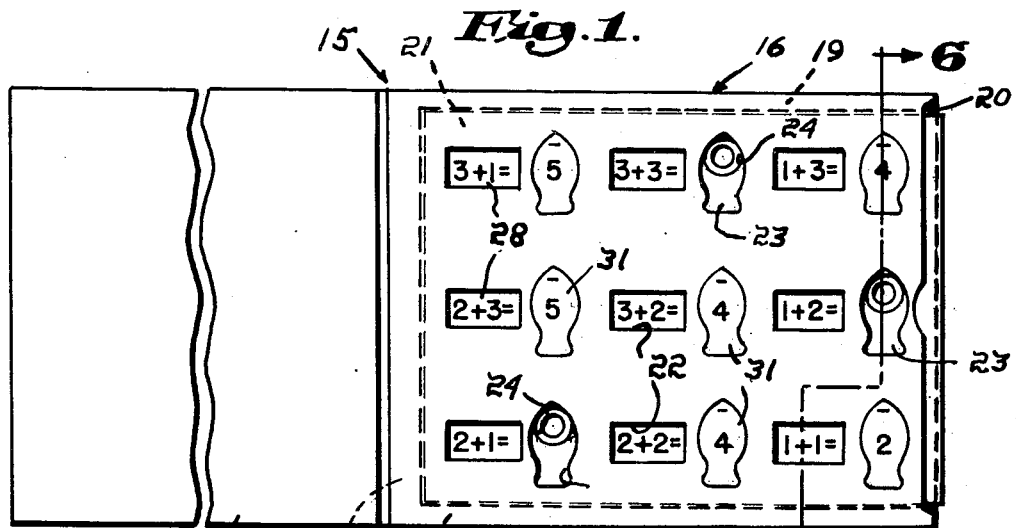
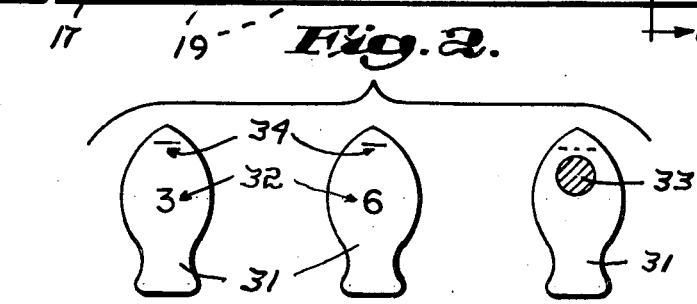
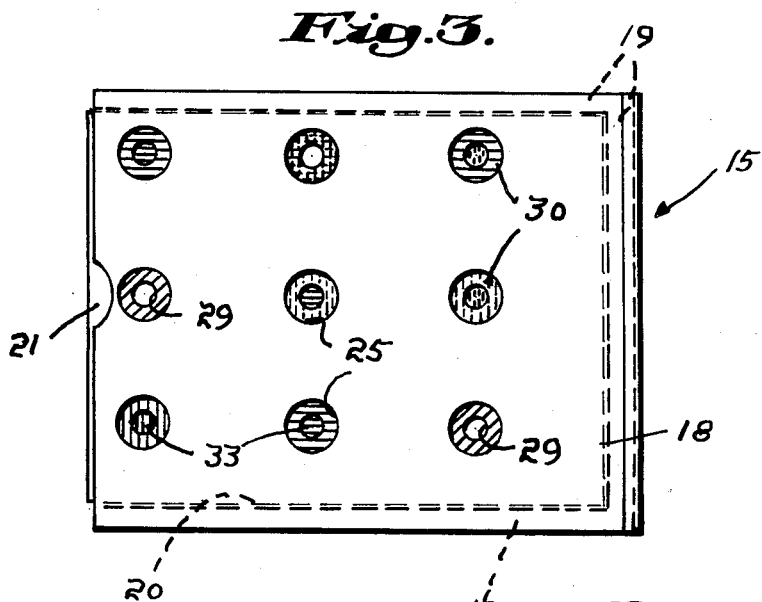
Inventor:
Charles L. Tilley,
by Abbott Spear,
Attorney Inventor:
Charles L. Tilley,
by Abbott Spear,
Attorney Feb. 6, 1973 C. L. TILLEY 3,714,721
EDUCATIONAL AND AMUSEMENT DEVICES
Filed Dec. 9, 1971 3 Sheets-Sheet 3
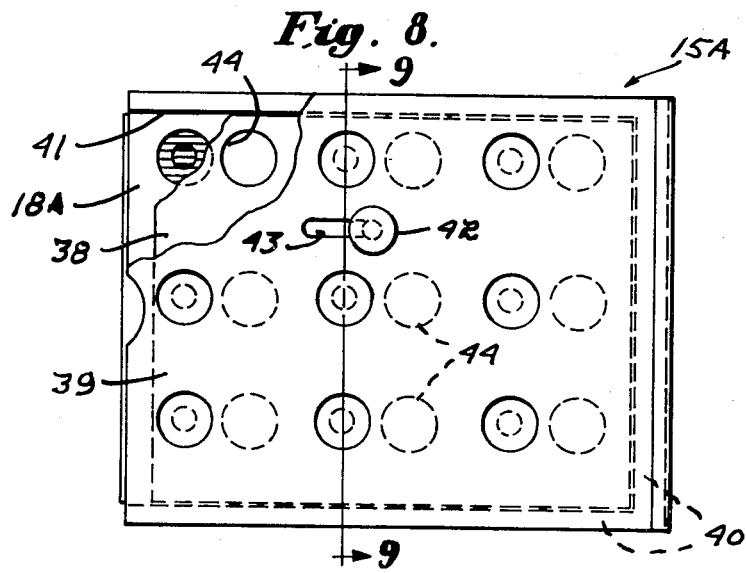
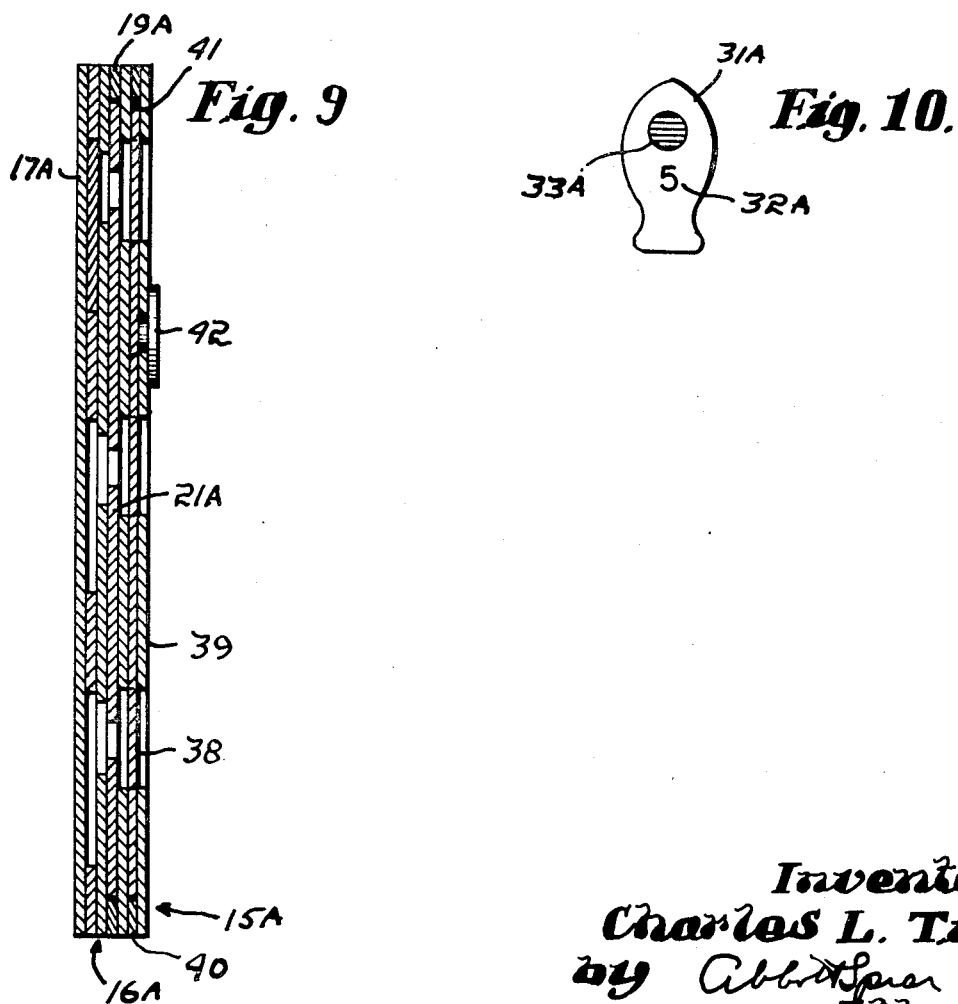
Inventor:
Charles L. Tilley,
by Abbot Spear
Attorney

United States Patent Office 3,714,721
Patented Feb. 6, 1973

3,714,721
EDUCATIONAL AND AMUSEMENT DEVICES
Charles L. Tilley, 41 Elm St., Saugus, Mass. 01906
Filed Dec. 9, 1971, Ser. No. 206,261
Int. Cl. G09b 3/02
U.S. Cl. 35—9 R    13 Claims

ABSTRACT OF THE DISCLOSURE

An educational and amusement device is disclosed that has a board adapted for use with work sheets having on their front faces a series of indicia, the board having openings exposing the indicia. A second series of indicia is provided by a group of members on the front face of whice indicia is printed and the board has means enabling any member to be associated with the indicia exposed in any of the openings. Both the back face of the work sheet and the back of the member have code means exposed at the back of the board enabling the correctness of the relationship of the members to the exposed indicia to be determined thereby. The device may be provided with a shield covering the code means but movable to expose them.

BACKGROUND OF THE INVENTION

It has long been recognized, in the education of small children that devices were important teaching aids in facilitating a child's understanding of the relationship between indicia such by way of examples as objects, shapes, numbers including simple arithmetic problems and letters and words.

In its simplest form, such an aid is a printed work sheet having a first series of indicia printed thereon including groups of different numbers of articles with a second series of printed indicia being different numbers. The child is required to relate, as by means of pencilled lines, the correct number to each group. A reusable device for use in that type of work with increased interest on the part of the child and increased convenience to the teacher is disclosed in the patent to Howatt and Tilley, No. 3,604,127.

There is a continuous demand for educational devices that will stimulate interest in the children and also enable their teaching to be more effectively and conveniently carried forward.

THE PRESENT INVENTION

The present invention relates to educational and amusement devices that meet the above referred to demand by requiring that the indicia of the second series be separate pieces so that the child must select the one bearing the correct indicia and place it in a predetermined relationship to the appropriate indicia of the first series.

In accordance with the invention, this objective is attained by providing such a device in the form of a board having a series of openings extending therethrough and a series of seats, one for each opening and located adjacent thereto and having a hole therein also extending through the board. A work sheet has a series of holes, one work sheet hole for each seat hole is registerable therewith when the work sheet is held in back of the board in a predetermined position. The work sheet has indicia on its front face that is exposed in the openings of the board in said predetermined position and code means on its back. The second series of indicia is a series of inserts each of which is shaped and dimensioned to fit any one of the seats and has indicia on its front related to that exposed in a particular one of the board openings. Each insert has on its back code means located to be exposed through the seat hole in which it is placed and the correction of the child's work is readily determined by comparing the code means thus exposed with that of the code means on the back of the work sheet.

It is preferred that the device include a backer that is provided with a series of holes, one for each seat hole and in registry therewith and dimensioned also to expose the appropriate code means of its work sheet. It is also preferred that the backer be so connected to the board as to provide positioning means for the work sheets. If desired, the code means may be on the exposed face of the backer instead of on the work sheet.

It is also preferred that the board have a cover hingedly conncted thereto to ensure that means are available to hold the inserts in their seats when the device is turned over to inspect the code means. The device may include a shield that conceals the code means and the shield may be removable or it may have holes located and dimensioned to expose the code means on short movement of the shield relative to the backer.

THE PREFERRED EMBODIMENT OF THE INVENTION

In the accompanying drawings, there is shown a preferred embodiment of the invention in which FIG. 1 is a view of the device in the form of a book shown as open and with the cover broken away;

FIG. 2 is a view of inserts on an increase in scale, two inserts shown front face up and the other front face down;

FIG. 3 is a view of the device as seen from its back with the cover closed;

FIG. 8 is a view of the back of a device in accordance with another embodiment of the invention utilizing a shield for the code means;

FIG. 9 is a section taken approximately along the indicated lines 9—9 of FIG. 8; and FIG. 10 is a view showing another insert in accordance with the invention, both faces of which are identical.

Figure 4:
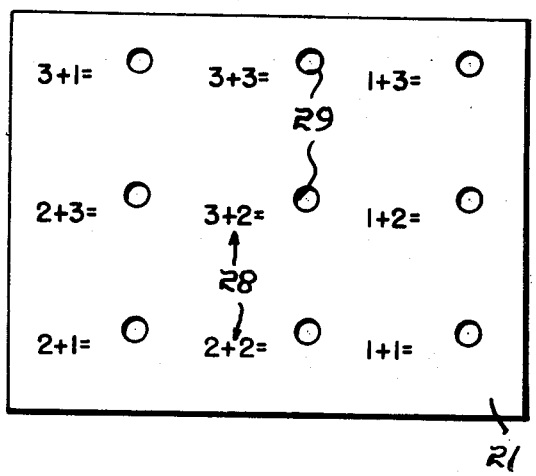
FIG. 4 is a front face view of a typical work sheet.

In the drawings, the device is shown as a book 15 comprising a board generally indicated at 16 having a cover 17 hingedly connected to an edge thereof and a backer 18 including a margin 19 extending along three sides of and secured to the undersurface or back of the board 16 to provide an open-ended slideway 20 enabling a work sheet 21 to be inserted and held in a predetermined position in back of the board 16 and removed therefrom when the work sheet has served its purpose.

Figure 6:
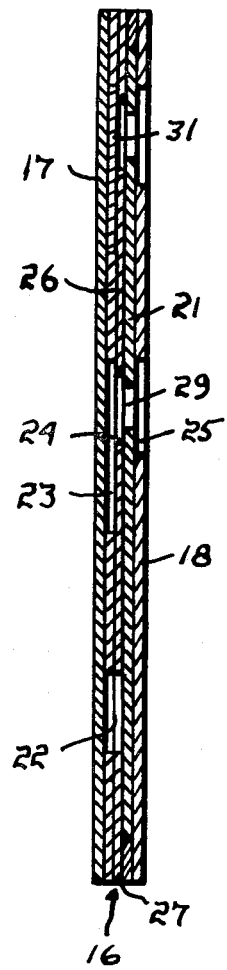
FIG. 6 is a section, on a substantial increase in scale, taken approximately along the indicated lines 6—6 of FIG. 1.
Figure 5:
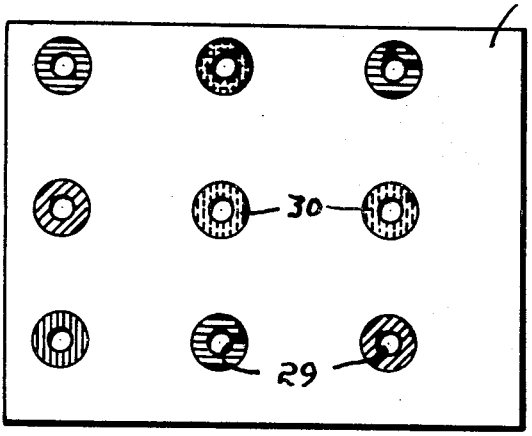
FIG. 5 is a view of the back thereof.
Figure 7:
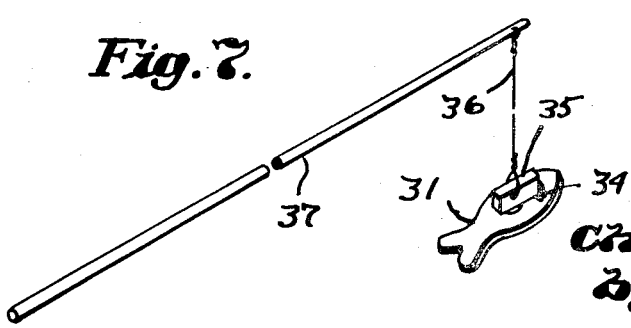
FIG. 7 is a view illustrating the use of an insert in the form of a simulated fish and a magnet as a means of selecting an insert.

The board 16 has a series of rectangular openings 22 extending therethrough and a series of seats 23, one seat 23 for each opening 22 and located closely adjacent thereto. The seats 23 are desirably of a particular shape and are shown as that of a fish. Each seat 23 has a hole 24 extending through the board 16 which registers with the appropriate one of a series of somewhat larger holes 25 with which the backer 18 is provided. The board 16 is shown in FIG. 6 as consisting of layers 26 and 27 with the layer 27 providing the bottom of the seats 23 and having the holes 24 formed therein.

Each work sheet 21 has a series of indicia 28 shown as an arithmetic problem, one problem for each opening 22 and located to be exposed therein when the work sheet is fully inserted in the slideway 20 and associated with each problem 28 is a hole 29 and, when a work sheet 21 is in place, registering with the appropriate holes 24 and 25. The holes 29 are smaller than the holes 25 and each has its margin coded, preferably by colors, as at 30 exposed through the appropriate hole 25 when the work sheet 21 is in place.

A series of inserts 31 is provided, each insert in the form of a fish and shaped and dimensioned to fit any one of the seats 23. In this connection, both series of holes 24 and 25 are desirably dimensioned to enable a child to dislodge a seated insert with a finger. The front face of each insert 31 is provided with indicia 32 related to particular indicia with which the work sheet 21 is provided, in this case, the answer to a particular one of the problems 28 exposed in an opening 22. On its back or undersurface, each insert 31 is color coded in an area 33 which is visible from the back of the board through the holes 25 and 29 when that insert has been placed in a seat 23. If a color thus exposed matches the surrounding circle of color 30, the indicia of the work sheet and of the insert have been properly related. A function of the cover 17 is, of course, that of ensuring that the inserts 31 remain seated when the back of the device is to be inspected for errors.

It will be noted that the indicia and codings are carried only by the work sheets 21 and the inserts 31 so that color locations can be varied. It is desirable that arithmetic problems and other kinds of problems of which letters, words, objects and shapes be distinguished from each other. This may be done by colors but is desirably done by providing devices each for a particular type of indicia relating problems with seats of different shapes so that the inserts for use with one device cannot be used with devices for other types of problems.

Each insert 31 is shown as having a metallic area 34 adjacent its head end enabling it to be picked up by means of a magnet 35 attached by a string 36 to a simulated fish rod 37. With this arrangement, the work by a child of finding, from a selected set, what he believes to be the correct insert is made an interesting game.

In FIGS. 8 and 9, a similar device is shown in which the color codings are concealed by a removable shield 38. The device is a book generally indicated at 15A and corresponding parts are distinguished by the addition of the suffix "A" to the appropriate reference numerals. The book 15A includes a second backer 39 having a margin 40 extending along three sides and secured to the backer 18A to provide a slideway 41 for the shield 38. The shield 38 has a headed stud 42 extending through a slot 43 in the backer 39 enabling the shield to be moved between first and second positions. The shield 38 is also provided with a series of holes 44, one for each of the holes of the backer 18A and registering therewith when the shield is moved from its first position into its second position, the color coding being then exposed. The shield 38 may be removable if desired.

In FIG. 10, an insert 31A is shown having both color codings 33A and indicia 32A on both surfaces thus to ensure that the indicia is always exposed.

From the foregoing, it will be apparent that the invention provides a device that enables work sheets to be completed on a basis attracting and holding the interest of a child and making the corrections of indicia relationships of a wide variety to be quickly and easily verified.

I claim:

1. An educational or game device comprising a board having a series of openings extending therethrough and a series of seats, one seat for each opening and adjacent thereto, each seat having a hole therein also extending through the board, a work sheet having a series of holes extending therethrough, one work sheet hole for each seat hole and registerable therewith when the board and work sheet are in a predetermined relationship with the work sheet in back of the board, said work sheet also having indicia on one face associated with each work seat hole and exposed in the appropriate opening of the board in said relationship and code means associated with each work sheet hole on the other face of the work sheet, and a series of inserts, each dimensioned to be placed in any of said seats and having indicia on the face thereof that is to be exposed when so placed and that is related to the indicia of the work sheet that is exposed in a particular one of the board openings, each insert also provided with code means on its other face positioned to be exposed through the hole of the seat in which it is placed, the matching of the code means of a work sheet hole with that of the code means exposed therein establishing that the indicia of the seated insert and that of the work sheet exposed in the associated opening were correctly related.

2. The educational or game device of claim 1 and means releasably holding the work sheet in said predetermined relationship in back of the board.

3. The educational or game device of claim 2 and a cover hingedly connected to the board and operable in its closed position to hold the inserts in their seats when the board is inverted to expose the code means.

4. The educational or game device of claim 3 in which the means holding the work sheet in place is a backer for the work sheet and connected to the board and having a series of holes therein, one for each seat hole and registerable therewith but sufficiently larger to expose the indicia of the work sheet associated with the appropriate one of the work sheet holes.

5. The educational or game device of claim 4 in which the backer and board are interconnected to provide a slideway for the work sheet.

6. The educational or game device of claim 4 in which the code means of the work sheet encircle the holes thereof.

7. The educational or game device of claim 1 in which each insert includes a magnetically responsive portion and each insert is of a shape representing an object of interest to a child whereby it may be selected from a group of inserts by means of a magnet.

8. The educational or game device of claim 6 in which the code means of the work sheets and of the inserts are colors that are to match if an insert is correctly seated.

9. The educational or game device of claim 1 and a backer for the work sheet and connected to the board and having a series of holes therein, one for each seat hole and registerable therewith but sufficiently larger to expose the indicia of the work sheet associated with the appropriate one of the work sheet holes.

10. The educational or game device of claim 9 and a shield blocking the holes of the backer but held by the device for movement relative thereto.

11. The educational or game device of claim 10 in which a second backer is secured to the first named backer and defining therewith a slideway for the shield.

12. The educational or game device of claim 11 in which the shield has a series of holes, one for each hole of the backer, said holes being spaced from the backer holes when the shield is seated and registering therewith when moved in the slideway to a predetermined extent.

13. The educational or game device of claim 12 in which the shield is connected to the second backer for limited sliding movement relative thereto.

References Cited

UNITED STATES PATENTS

| | | | |
|---|---|---|---|
| 1,696,988 | 1/1929 | Troidl | 35—9 R X |
| 1,946,318 | 2/1934 | Hamilton | 35—31 D |
| 2,892,267 | 6/1959 | Harvey | 35—31 D |
| 3,099,095 | 7/1963 | Fallingborg et al. | 35—9 R X |
| 3,154,863 | 11/1964 | La Prelle | 35—9 R |
| 3,604,127 | 9/1971 | Howatt et al. | 35—9 R |

FOREIGN PATENTS

| | | | |
|---|---|---|---|
| 911,228 | 5/1954 | Germany | 35—31 D |

WILLIAM H. GRIEB, Primary Examiner

U.S. Cl. X.R.

35—31 D